United States Patent [19]

Funderburk

[11] 3,893,144

[45] July 1, 1975

[54] PISTOL GRIP FOR A CAMERA

[76] Inventor: Ervin M. Funderburk, 1648 Providence Rd., Charlotte, N.C. 28207

[22] Filed: Oct. 18, 1973

[21] Appl. No.: 407,423

Related U.S. Application Data

[63] Continuation-in-part of Ser. No. 300,827, Oct. 25, 1972, abandoned.

[52] U.S. Cl. .............................. 354/293; 354/269
[51] Int. Cl. ........................................... G03b 17/00
[58] Field of Search ......... 95/86; 354/266, 269, 293

[56] References Cited
UNITED STATES PATENTS

| | | | |
|---|---|---|---|
| 1,205,079 | 11/1916 | Bartlett | 354/269 |
| 2,614,471 | 10/1952 | Markowitz | 95/86 |
| 2,795,173 | 6/1957 | Bates | 95/86 X |
| 2,933,976 | 4/1960 | Trickett | 95/86 |
| 3,101,035 | 8/1963 | Williams | 95/86 |
| 3,263,588 | 8/1966 | Robinson | 95/86 |
| 3,301,627 | 1/1967 | Kimura | 95/86 |
| 3,511,159 | 5/1970 | Hobbs | 95/86 |

*Primary Examiner*—John M. Horan
*Attorney, Agent, or Firm*—Parrott, Bell, Seltzer, Park & Gibson

[57] ABSTRACT

A pistol grip for use with a camera including an elongate handle, a generally horizontal mounting surface located adjacent the upper end of the handle for mounting a camera thereon, a trigger located in the upper portion of the handle for being depressed by the forefinger of the hand gripping the handle, and means connected with the trigger for operating the shutter release of the camera when the trigger is depressed. The pistol grip is adapted for use with cameras of various sizes and includes several features particularly adapted for facilitating holding the camera motionless while making an exposure.

5 Claims, 6 Drawing Figures

PATENTED JUL 1 1975　　　　　　　　　　　　　　　　　　　　3,893,144

PISTOL GRIP FOR A CAMERA

This application is a continuation-in-part of my earlier-filed copending application Ser. No. 300,827, filed Oct. 25, 1972 and entitled PRECISION CAMERA PISTOL GRIP ASSEMBLY, now abandoned.

The present invention relates to a camera attachment, and more particularly to an improved pistol grip for use with a camera.

It is a primary object of the present invention to provide a pistol grip attachment for use with a camera for providing a convenient support for the camera to facilitate manipulation and operation thereof and wherein the grip is particularly designed for providing a firm and steady support for the camera to facilitate holding the camera motionless while making an exposure.

It is a further primary object of this invention to provide a pistol grip having a handle particularly designed for being held by the hand comfortably and without tiring, and wherein the pistol grip is adapted for operating the shutter of a camera smoothly and without jarring or tilting the camera.

It is a still further object of the invention to provide a pistol grip of the type described which may be easily attached to a camera and which is adaptable for use with cameras of various sizes.

It has been found in accordance with the present invention that the above objects may be accomplished by providing a pistol grip comprising a mounting platform having a generally planar horizontal mounting surface for supporting the lower surface of a camera body thereon, fastener means associated with the mounting surface for securing the camera body to the mounting surface, an elongate handle extending downwardly and forwardly from the mounting platform and also being skewed laterally toward one side thereof, with the forwardly extending and laterally skewed angular relation of the handle thereby enabling the pistol grip to be held in the hand comfortably and without bending the wrist, a trigger located in the upper portion of the handle for being depressed by the forefinger of the hand gripping the handle, and means operatively connected with the trigger for operating the shutter release of the camera when the trigger is depressed. It has also been found in accordance with the present invention that by mounting the trigger for slideable movement in the handle along an axis approximately perpendicular to the axis of the handle, the trigger is adapted for being depressed smoothly into the handle without causing tilting of the pistol grip.

It has been further found that by providing contoured flange portions extending outwardly from the upper portion of the handle of the grip so as to be adapted for resting on the thumb and forefinger at the upper portion of the hand gripping the handle, the flange portions will thereby serve to transfer the weight of the camera away from the fingers and to the upper portion of the hand to thereby facilitate maintaining a steady grip on the handle and enable depressing the trigger without tilting or moving the camera.

It has also been found that by locating the mounting surface upon which the camera is mounted behind the handle, the center of gravity of the camera is thereby positioned substantially above the handle and the pistol grip is thereby evenly balanced and adapted for providing steady and positive control over the camera.

In accordance with another broad aspect of the invention, it has been found that the pistol grip can be adapted to more smoothly operate the shutter release of the camera while facilitating maintaining steady and positive control over the camera by providing a linkage mechanism between the trigger and the shutter release of the camera which includes means for providing a mechanical advantage to the trigger so that the trigger may be depressed with less force than the force required to depress the shutter release of the camera.

Some of the objects and advantages of the invention having been stated, others will appear when taken in connection with the accompanying drawings, in which FIG. 1 is a front elevational view of a pistol grip in accordance with the invention, as attached to a camera;

Figure 1:
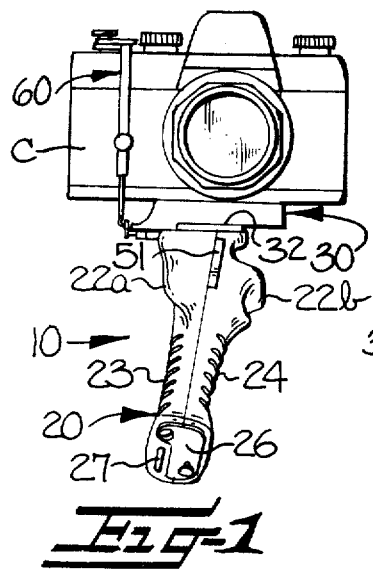
Figure 3:
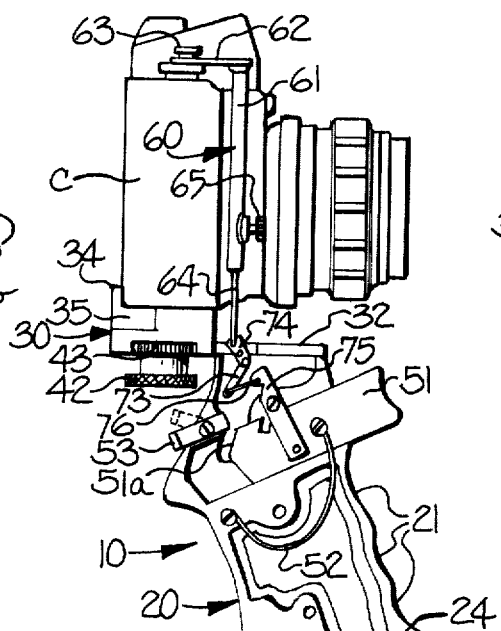
FIG. 3 is a side elevational view of the pistol grip shown with half of the handle removed to reveal the interior thereof.
Figure 2:
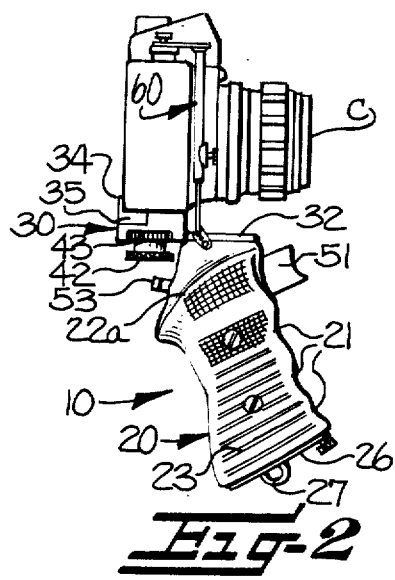
FIG. 2 is a side elevational view corresponding to FIG. 1.

Referring now more particularly to the drawings, a pistol grip, broadly designated at 10, is shown in FIG. 1–3 attached to a camera, designated by the reference character C. As illustrated, camera C is a 35 millimeter single lens, reflex type camera having an eye level view finder and including a shutter release for tripping the shutter release mechanism of the camera. It is to be understood, however, that the pistol grip of the present invention may be employed with other types and sizes of cameras besides that specifically shown.

As illustrated, the pistol grip includes an elongate handle, broadly designated at 20, of hollow construction and a mounting platform, broadly designated at 30, adapted for having the body of a camera secured thereto.

As illustrated, handle 20 is formed separately from mounting platform 30 and is secured by screws 31 to a forwardly extending flange portion 32 of mounting platform 30. Handle 20 extends downwardly and forwardly from flange portion 32 and, as best seen from FIG. 1, is also skewed laterally toward one side of the mounting platform. Thus, the lower end of handle 20 is positioned forwardly and to one side of the upper end of the handle at the attachment thereof to flange portion 32. The forwardly extending and laterally skewed angular relation of the handle is particularly designed to enable the pistol grip to be held in the hand comfortably when in use, and without requiring flexing or bending at the wrist. Since this angular relation of the handle positions the wrist in its normal, unflexed position when operating the camera, the pistol grip may be used for extended periods of time without tiring or fatiguing the user.

Preferably, the handle is pitched forwardly from the vertical at an acute angle, so that the axis of said handle defines an angle of about 10° to 30° with respect to an imaginary vertical axis perpendicular to the horizontal mounting surface of mounting platform 30. The lateral or sideward skew of the handle also defines an acute angle with respect to the vertical, with the axis of the handle defining an angle of about 5° to 15° with respect to the imaginary vertical axis perpendicular to the horizontal mounting surface.

Handle 20 is of sculptured form and is provided with several finger recesses 21 along the front side thereof and with contoured flanged portions 22a, 22b, 22c extending outwardly from the handle near the upper end thereof. Together, flange portion 22a, 22b and 22c define a continuous contoured flange which extends outwardly from the rear and from both sides of the handle 20 and which is sculptured so as to conform with the curvature of the upper portion of the hand gripping the handle. The handle illustrated is adapted for being gripped by the right hand, anad thus flange portion 22a on the right side of the handle is adapted for resting on the upper exposed surface of the forefinger of the hand gripping the handle, while flange portion 22b on the left hand of the handle is adapted for resting on the upper exposed surface of the thumb of the same hand. As illustrated, flange portion 22a curves arcuately downwardly toward the rear of the handle, and flange portion 22b similarly curves arcuately downwardly. Flange portion 22c, which extends rearwardly from the handle is adapted for resting on the upper exposed portion of the hand where the thumb and the forefinger meet. By extending outwardly in this manner and engaging the upper portion of the hand, flange portions 22a, 22b, 22c thereby serve to transfer the weight of the camera onto the upper portion of the hand and to reduce the weight carried by the fingers. Thus, it is not necessary to exert a substantial pressure with the fingers in order to carry the weight of the camera and to maintain a grasp on the pistol grip, and the fingers merely need to exert a light pressure in order to maintain the camera in balance.

Handle 20 is formed in two halves 23, 24 by a suitable molding operation. The handle is provided with a hollow cavity therein which may suitably be employed for storing small tools or other articles therein. To this end, an opening 25 is provided in the butt portion of the handle and a cover plate 26 is pivotally mounted on the butt portion for closing the opening 25. An eye 27 is also provided on the butt portion of the handle for securing a strap or lanyard thereto. As illustrated, the outer surface of the handle is provided with small ribs and knurls to facilitate maintaining a secure grip on the handle.

Referring now more specifically to mounting platform 30, it will be noted that mounting platform 30 has a generally planar horizontal upper surface of a width substantially greater than its depth for mounting a camera thereon and is provided with a forwardly extending flange portion 32 at the front end thereof for securing handle 20 thereto. The horizontal mounting surface of mounting platform 30 is thus located behind handle 20. This serves to help position the center of gravity of camera C substantially above handle 20 and to improve the balance of the camera and pistol grip. Such positioning of mounting platform 30 thus reduces or avoids the tendency of the camera to tilt forwardly or downwardly because of the weight thereof.

Figures 4, 5, 6:
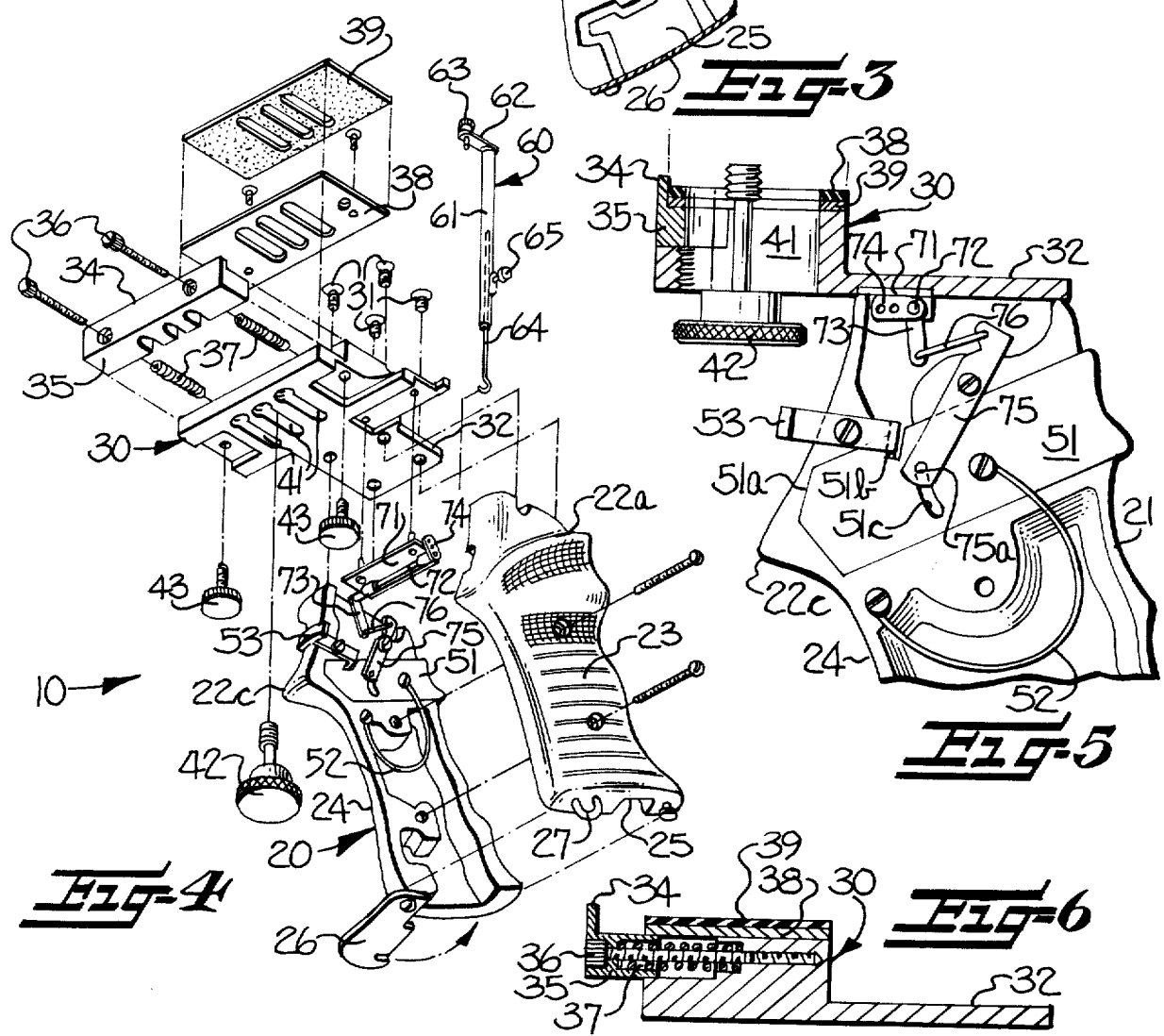
FIG. 4 is a schematic exploded view showing the various parts of the pistol grip.
FIG. 5 is an enlarged fragmentary view similar to FIG. 3, but showing the mounting platform in section.
FIG. 6 is an enlarged detailed sectional view of the mounting platform.

Mounting platform 30 is also provided with an upwardly extending flange 34 (FIG. 3) which extends transversely of the mounting platform along the rear edge thereof for engaging the back of the camera to facilitate firm securement of the camera to the pistol grip. Flange 34 is laterally adjustable so that the pistol grip may accommodate cameras of various depths. Referring to FIG. 4, it will be seen that flange 34 is formed along the upper rear edge of a bar 35. Adjusting screws 36 pass through bar 35 and are threadably received in base member 31, while springs 37 are positioned surrounding the shafts of screws 36 and serve to bias bar 35 outwardly from base member 31 so that flange 34 may be adjusted laterally by loosening or tightening adjusting screws 36. Plate member 38 is secured to the upper surface of base member 31, and a cushion member 39, preferably of a resilient material such as rubber or vinyl, is positioned overlying plate 38 and provides a non-slip surface for mounting of the camera thereon.

As illustrated in FIG. 4, three openings in the form of longitudinal slots 41 are provided through the mounting platform assembly 30, and a thumb screw 42 is provided for extending through one of the slots 41 and threadably engaging the threaded tripod socket of a camera for fastening or securing the camera to the horizontal upper surface of mounting platform 30. Usually, this thumb screw 42 is positioned in the centermost slot 41, since the tripod socket for most cameras is located in the center of the underside of the camera body. However, additional slots are provided in the event a camera is employed having the tripod socket located in a different position. The longitudinal extent of the slots 41 also permits accommodating cameras having various other tripod socket locations. Additional thumb screws 43 are provided on each side of base member 31 and are adapted for securing other camera attachments, such as a flash attachment, to the pistol grip assembly.

Referring now to FIG. 5, it will be noted that an elongate trigger 51 is mounted for slidable movement in the upper portion of handle 20 with the axis of the sliding movement of the trigger being substantially perpendicular to the axis of the elongate handle. Thus, as seen in FIG. 3, when the pistol grip is held upright, the trigger is depressed into the handle at an angle with respect to the horizontal. By mounting the trigger in this manner, the trigger may be depressed into the handle by the forefinger of the hand gripping the pistol grip without causing tilting or jarring of the camera.

Spring means 52, formed from an elongate piece of spring wire, is provided for facilitating normally maintaining the trigger in its fully extended outward position. A safety catch 53 is provided at the rear of the upper portion of handle 20 and is adapted for immobilizing the trigger at times to prevent accidentally tripping the shutter release of the camera. By pivoting the outer exposed end of safety catch 53 upwardly when the trigger is fully released, the inner end thereof will engage the beveled inner end 51a of trigger 51 to prevent accidentally depressing the trigger. To facilitate transportion and storage of the pistol grip, trigger 51 may be immobilized in its fully depressed condition by pivoting the outer end of safety catch 53 upwardly and causing the inner end thereof to engage notch 51b of trigger 51.

Referring now to FIG. 4, a connector member, broadly designated at 60, is provided for interconnecting the shutter release of the camera with the trigger and linkage mechanism of the pistol grip. Connector member 60 includes a tubular body portion 61 and a horizontal extension 62 carried by the upper end of tubular body portion 61. A thumb screw 63 is provided at one end of the extension 62 and is adapted for securing the connector member to the shutter release of the camera. The body portion 61 of connector member 60 is adapted for telescopically receiving therein an elongate rod 64 having a hook formed in the lower end thereof. The tubular body portion 61 is also provided with a thumb screw 65 so that the elongate rod 64 may be secured at any desired position within the body member. This permits adjusting the length of the connector member to accommodate cameras of various heights.

Referring now more particularly to the linkage mechanism which interconnects the trigger assembly with the connector member 60, it will be noted that a support member 71 is attached to the underside of base member 31 of the mounting platform and that a rocker shaft 72 is journaled therein and extends horizontally from within the hollow handle outwardly to one side thereof. A relatively long lever arm 73 is provided at one end of the rocker shaft 72 interiorly of the handle and is relatively short lever arm 74 is carried at the opposite end of the rocker shaft 72 exteriorly of the handle. Lever arm 74 has two holes therein adapted for engaging the hook portion at the lower end of rod 64. Referring to FIG. 5, it will be seen that a pivot arm 75 is mounted within the handle, and is provided with a pin 75a at one end thereof for engaging an arcuate slot 51c in trigger 51. A link arm 76 is attached to the opposite end of pivot arm 75 and interconnects the pivot arm with lever arm 73. Thus, it will be seen that the linkage mechanism interconnecting trigger 51 with connector member 60 is adapted for imparting downward movement to the connector member when trigger 51 is depressed.

Since the lever arms at opposite ends of the rocker shaft 72 are of unequal length, with the arm 73 connected to the trigger being of a greater length, a mechanical advantage is provided to the trigger such that a relatively large movement of the trigger results in a relatively small movement of the lever arm 74. Thus, when the connector member is attached to one of the holes in lever arm 74, the trigger may be depressed with much less force than that required to depress the shutter release of the camera. This facilitates smoothly operating the shutter release of the camera without tilting or jarring the camera.

The amount of ratio of the mechanical advantage provided by the linkage assembly may be adjusted within limits by interconnecting the connector member 60 with either the inner or outer hole on lever arm 74. Thus, when the pistol grip is employed with a camera having a shutter release of relatively long throw, the outer hole may be employed, and when a camera having a shutter release of relatively short throw is employed, the inner hole may be employed.

In the drawings, and specification, there has been set forth a preferred embodiment of the invention, and although specific terms are employed, they are used in a generic and descriptive sense only and not for purposes of limitation.

That which is claimed is:

1. A camera having a shutter mechanism and a downwardly operating shutter release for tripping said shutter mechanism when making an exposure, and in combination therewith a pistol grip adapted for providing steady and positive control over the camera while making an exposure, said pistol grip comprising an elongate handle, a generally planar horizontal mounting surface located adjacent the upper end of the handle and supporting the lower surface of said camera thereon, fastener means associated with said mounting surface and securing said camera to the mounting surface, a trigger located in the upper portion of said handle and adapted for being depressed by the forefinger of the hand gripping the handle, an elongate connector member extending upwardly above said mounting surface, means carried by the upper end of said connector member for attaching the connector member to said shutter release, a linkage mechanism interconnecting the lower end of said elongate connector member and said trigger for imparting downward movement to the connector member when the trigger is depressed, said connector member and linkage mechanism being thereby adapted to operate the shutter release of said camera when said trigger is depressed, said linkage mechanism including means for providing a mechanical advantage to said trigger whereby the trigger may be depressed with less force than the force required to depress the shutter release of the camera for thereby facilitating smoothly tripping the shutter mechanism of the camera while maintaining steady and positive control over the camera, and said linkage mechanism also including means permitting adjusting the amount of mechanical advantage provided in the linkage mechanism for accommodating cameras having varying lengths of throw in the shutter release.

2. The combination of claim 1, further comprising means for immobilizing the trigger at times to prevent accidentally tripping the shutter release of the camera.

3. A camera having a shutter mechanism and a downwardly operating shutter release for tripping said shutter mechanism when making an exposure, and in combination therewith a pistol grip adapted for providing steady and positive control over the camera while making an exposure, said pistol grip comprising an elongate handle, a generally planar horizontal mounting surface located adjacent the upper end of the handle and supporting the lower surface of said camera thereon, fastener means associated with said mounting surface and securing said camera to the mounting surface, means defining an upwardly extending flange located adjacent the rear edge of said mounting surface for engaging the back surface of said camera and facilitating obtaining firm securement of the camera to said mounting surface, and means for adjusting the position of said flange forward or backward with respect to said mounting surface for accommodating cameras of various depths, a trigger located in the upper portion of said handle and adapted for being depressed by the forefinger of the hand gripping the handle, an elongate connector member extending upwardly above said mounting surface, means carried by the upper end of said connector member for attaching the connector member to said shutter release, a linkage mechanism interconnecting the lower end of said elongate connector member and said trigger for imparting downward movement to the connector member when the trigger is depressed, said connector member and linkage mechanism being thereby adapted to operate the shutter release of said camera when said trigger is depressed, said linkage mechanism including means for providing a mechanical advantage to said trigger whereby the trigger may be depressed with less force than the force required to depress the shutter release of the camera for thereby facilitating smoothly tripping the shutter mechanism of the camera while maintaining steady and positive control over the camera.

4. The combination of claim 3, wherein said means for adjusting the position of said flange forward or backward with respect to said mounting surface comprises threaded adjustment means operably associated with said flange means so as sto adjust the position of the flange forwardly or rearwardly upon rotational adjustment of the threaded adjustment means, and spring means cooperating with said flange means for biasing the flange in a rearward direction.

5. A still camera having a shutter mechanism and a downwardly operating shutter release on the upper side thereof for tripping said shutter mechanism when making an exposure, and in combination therewith a pistol grip adapted for providing steady and positive control over the camera while making an exposure, said pistol grip comprising an elongate handle, a generally planar horizontal mounting surface located adjacent the upper end of the handle and supporting the lower surface of said camera thereon, fastener means associated with said mounting surface and securing said camera to the mounting surface, a trigger located in the upper portion of said handle and adapted for being depressed by the forefinger of the hand gripping the handle, an elongate rigid connector member extending upwardly above said mounting surface and having the upper end thereof connected to said shutter release, a linkage mechanism interconnecting the lower end of said elongate connector member and said trigger for imparting downward movement to the connector member when the trigger is depressed, said connector member and linkage mechanism being thereby adapted to operate the shutter release of said camera when said trigger is depressed, said elongate rigid connector member including means for adjusting the length thereof for thereby accommodating cameras of different sizes, and said linkage mechanism including means for providing a mechanical advantage to said trigger whereby the trigger may be depressed with less force than the force required to depress the shutter release of the camera for thereby facilitating smoothly tripping the shutter mechanism of the camera while maintaining steady and positive control over the camera.

* * * * *